United States Patent
Bomma et al.

(10) Patent No.: US 8,214,609 B2
(45) Date of Patent: Jul. 3, 2012

(54) DATA TRANSFERENCE TO VIRTUAL MEMORY

(75) Inventors: Shashidhar Bomma, Austin, TX (US); Andrew Dunshea, Austin, TX (US); Douglas J. Griffith, Georgetown, TX (US); Jean-Philippe Sugarbroad, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 12/174,476

(22) Filed: Jul. 16, 2008

(65) Prior Publication Data
US 2010/0017576 A1 Jan. 21, 2010

(51) Int. Cl.
*G06F 12/12* (2006.01)
(52) U.S. Cl. .......................... 711/159; 711/160; 711/152
(58) Field of Classification Search .................. None
See application file for complete search history.

(56) References Cited

U.S. PATENT DOCUMENTS

| | | | |
|---|---|---|---|
| 5,555,399 A * | 9/1996 | Waldron et al. | 711/159 |
| 5,860,141 A | 1/1999 | Washington et al. | |
| 6,138,211 A | 10/2000 | Ahn et al. | |
| 6,886,085 B1 | 4/2005 | Shuf et al. | |
| 7,039,766 B1 | 5/2006 | Smith | |
| 7,143,399 B2 | 11/2006 | Civlin | |
| 2007/0157021 A1* | 7/2007 | Whitfield | 713/156 |
| 2010/0161934 A1* | 6/2010 | Alvarez et al. | 711/206 |

* cited by examiner

*Primary Examiner* — Than Nguyen
(74) *Attorney, Agent, or Firm* — Stephen J. Walder, Jr.; John D. Flynn

(57) ABSTRACT

Some embodiments comprise a method for selecting data to be transferred to a storage space of virtual memory and include identifying a set of data and determining subsets. Determining subsets may allow for delays before transferring the subsets and allow access to memory of the subsets during the delays. Accesses during the delays may enable embodiments to select other data to be transferred to the storage space and prevent transference of the accessed data. Other embodiments comprise apparatuses that have a paging space, a page identifier, and a page transferrer to transfer pages to the paging space after a delay. The delay may prevent a number of pages from being transferred to the paging space, such as for pages that were accessed during the delay.

19 Claims, 4 Drawing Sheets

DATA TRANSFERENCE TO VIRTUAL MEMORY

BACKGROUND

The present disclosure relates generally to memory management technologies for computing devices. More particularly, the present disclosure relates to controlling the transfer of data for virtual memory management of a computing device. Most modern computer systems employ a type of virtual memory management (VMM) system that is controlled by an operating system. The VMM presents each application or process a separate virtual address space and creates an illusion of large and fast physical memory through the use of a hierarchy of memories of different sizes which usually operate at different speeds. The VMM and the OPERATING SYSTEM are responsible for mapping physical pages to corresponding virtual pages and page faults may occur when attempted accesses to virtual addresses do not have valid translations to corresponding physical addresses.

VMM systems are usually demand-driven. Consequently, pages that were previously saved to paging space, such as external storage consisting of a swap space on a disk, are brought into physical memory when they are referenced-on demand. Usually, the external storage devices operate significantly slower than physical random access memory (RAM), due to such factors as seek time, access latency, etc. Because sending pages out to the paging space, reading pages, and bringing pages into physical memory consumes significant amounts of time, a program or an application will usually need to yield to another process or application and wait, potentially thousands of processor cycles, without making any progress until the requested page arrives. Similarly, if a program faults while referencing a page that is not in physical memory, program execution will have to stall until the page becomes available, at which point execution of the program can continue.

Normally, a processor can only manipulate information, or data, located in physical memory that is located close to the processor, such as registers, caches, and main memory which is usually RAM. The VMM usually retrieves the data from a disk or a network, brings the data closer to the processor upon request, and finds the appropriate places to store that data in main memory. Under significant memory loads of the computer system, the amount of main memory which remains free may drop extremely low. For example, a user may execute numerous applications which use relatively large quantities of main memory. If no space is available in main memory, some of the existing information must be removed and pushed out to the paging space.

In most systems today, the VMM and a paging daemon work together to determine that the data that should be removed and pushed out to or stored in a paging space. When the requested amount of memory is significantly greater than the remaining free amount of main memory, a large number of pages in the system must be pushed out to the paging space. Pushing a large number of pages out to the paging space may result in a significant number of the selected pages being immediately returned to main memory due to reference of those pages.

BRIEF SUMMARY

In general, embodiments control the transfer of data for virtual memory management of a computing device. Some embodiments comprise a method for transferring data or information to a storage space of virtual memory. These embodiments may include identifying a set of data to be transferred to the storage space and transferring a first subset of the set to the storage space, or at least a portion of the first subset. These embodiments further comprise selecting a second subset of data of the set to transfer to the storage space, with the second subset comprising data accessible during the time the first subset is transferred. Some alternative embodiments may also comprise placing a daemon of the virtual memory system into a sleep state while transferring on or more subsets of data.

Other embodiments comprise apparatuses that have a VMM system with a paging space, a page identifier to identify pages and subsets of pages to be sent to the paging space, and a page transferrer to transfer pages of the set to the paging space. These embodiments may transfer a first subset of data to the paging space while allowing access to the rest of the data in the set or at least a second subset of data of the set. The delay associated with the transference of the first subset may allow the apparatus to remove a number of pages from the second subset, preventing them from being transferred to the paging space, such as for pages that were accessed during the delay period. Alternative embodiments may also include a page monitor to monitor which pages of the set are accessed before being blocked for transfer to the paging space. Other alternative embodiments may have a performance tuner that alters a size of a subset to be transferred to the paging space based on the accesses of the identified pages.

Other embodiments may be a computer program product comprising a computer readable medium including instructions that, when executed by a processor identify a set of data to be transferred to a storage space of virtual memory. The embodiments further include instructions that transfer a first subset of the set to the storage space. The embodiments also include instructions that identify a second subset of the set by removing data of the set accessed while transferring data of the first subset.

DETAILED DESCRIPTION

The following is a detailed description of novel embodiments depicted in the accompanying drawings. The amount of detail offered is not intended to limit anticipated variations of the described embodiments. To the contrary, the claims and detailed description are to cover all modifications, equivalents, and alternatives falling within the spirit and scope of the present disclosure as defined by the appended claims. The detailed descriptions below are designed to make such embodiments understandable to a person having ordinary skill in the art.

Generally speaking, methods and arrangements to control the transfer of data for virtual memory management of a computing device are contemplated. Some embodiments comprise an apparatus that may be part of a computer system, such as a desktop computer, a laptop, a portable computing device, or the like. The computer system may comprise a processor, physical memory, and a VMM system, wherein the VMM system controls the transfer of data between the physical memory and a paging space. In many embodiments, the paging space may comprise a data storage device, such as a hard drive. In several embodiments, applications of the computer system may request additional memory from the VMM system. The VMM system may respond by identifying a set of data in physical memory and initiating transfer of a portion of the data to the paging space, while still enabling or permitting access to data of the set not being transferred. Subsequently, the VMM may determine which data of the set was accessed after the initiation of the transfer of the first set and remove that data from subsequent sets being transferred to the paging space.

In some embodiments, the VMM employs a least recently used (LRU) data routine to select pages as candidates to pushing out to the paging space. In such embodiments, this process may be referred to as LRU pacing.

While some of the specific embodiments described below will reference the embodiments with specific configurations, those of skill in the art will realize that embodiments of the present disclosure may advantageously be implemented with other configurations with similar issues or problems.

Figure 1:
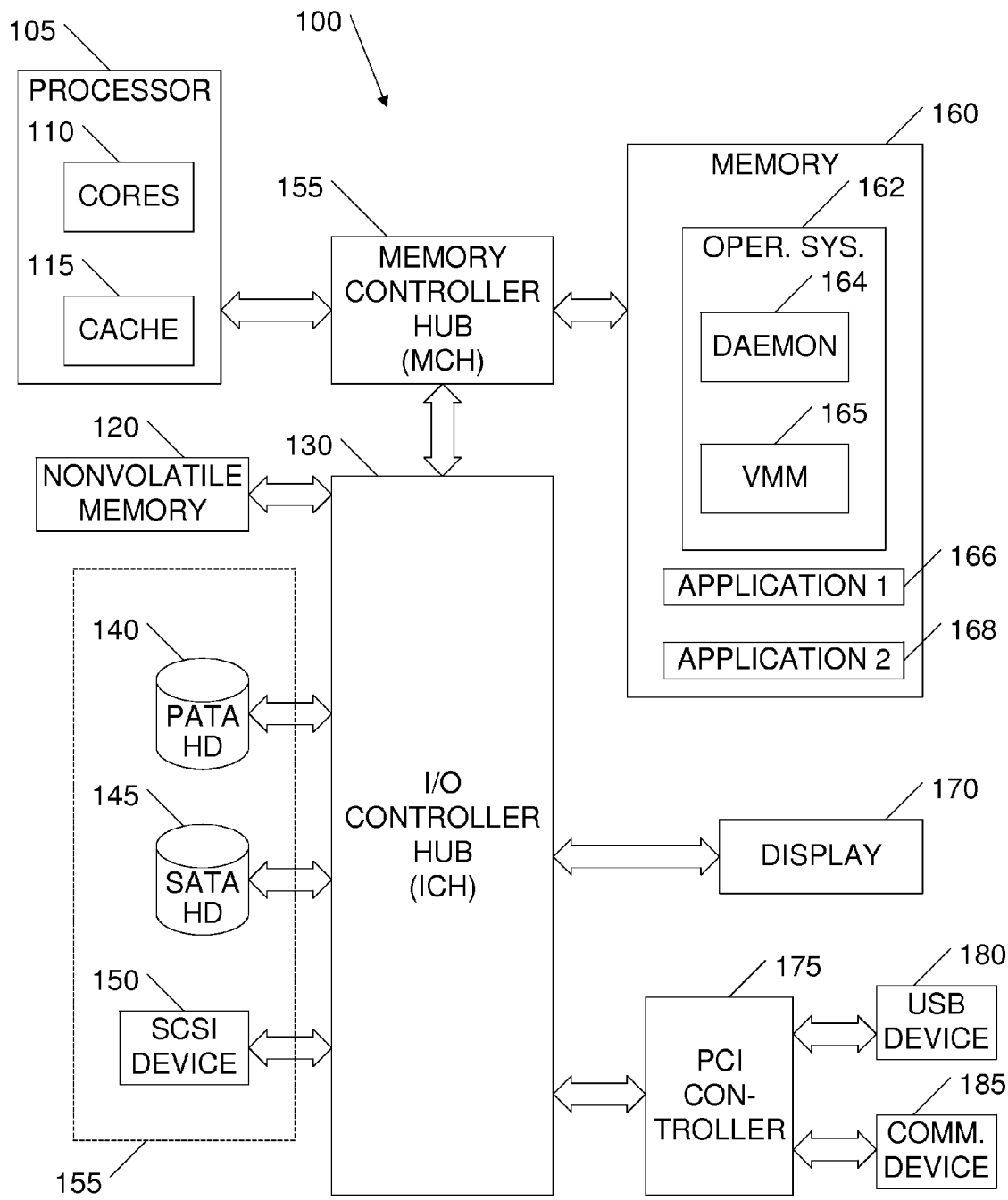
FIG. 1 depicts an embodiment of a system that may employ one or more Least Recently Used (LRU) pacing techniques, comprising a processor, physical memory, and numerous information storage devices.

Turning now to the drawings, FIG. 1 depicts a system 100 with a processor 105 comprising multiple cores 110. In some embodiments system 100 may comprise a computer system, such as a desktop computer, a palmtop computer, or personal digital assistant (PDA). In other embodiments system 100 may comprise a different type of computing apparatus, such as a server. For example, system 100 may comprise a notebook or laptop computer used by a college student to create documents using such applications as word processors and/or spreadsheet programs. Additionally, the student may use the notebook computer to run a web browser, an e-mail program, and an Internet chat application.

In other embodiments, system 100 may comprise a desktop computer in a business setting. Similar to the laptop computer of the student, the desktop computer may run a word processing application, a spreadsheet program, a database program, as well as other types of applications. For example, application 166 may comprise a word processing application and application 168 may comprise a database application. Additionally, or in the alternative, the desktop computer may execute dedicated or specialized business applications, such as computer aided design (CAD), computer aided manufacturing (CAM), or supervisory control and data acquisition (SCADA) applications. In further embodiments, system 100 may comprise another type of computing apparatus, such as a server, running a variety of other types of applications, such as a web server and a simple mail transport protocol (SMTP) application. Of the various embodiments, each one may employ one or more of the various techniques described herein to store information for the applications in a memory storage device.

In some embodiments, processor 105 may have a relatively small number of cores 110, such as one or two, while in other embodiments processor 105 may have a relatively large number of cores 110, such as eight, thirty-two, or more. Processor 105 may be coupled to a memory controller hub (MCH) 155. Processor 105 may execute operating instructions for programs and applications 166 and 168 for users of system 100, such as instructions of the word processing or CAD applications noted above. Such software programs and related instructions may be stored in physical memory 160. Processor 105 may execute the instructions in physical memory 160 by interacting with MCH 155. The types of memory devices comprising physical memory 160 may vary in different embodiments. In numerous embodiments, physical memory 160 may comprise volatile memory elements, such as two 1-gigabyte (GB) dynamic random access memory (DRAM) modules. In alternative embodiments, physical memory 160 may comprise nonvolatile memory. For example in an alternative embodiment physical memory 160 may comprise a flash memory module, such as a 4 GB flash memory card.

MCH 155 may also couple processor 105 with an input-output (I/O) controller hub (ICH) 130. ICH 130 may allow processor 105 to interact with external peripheral devices, such as keyboards, scanners, and data storage devices. Programs and applications being executed by processor 105, and ultimately one or more cores 110, may interact with such external peripheral devices. For instance, processor 105 may present information to a user via a display device coupled to display 170. In some embodiments, the type of display device may be a cathode-ray tube (CRT) monitor, a liquid crystal display (LCD) screen, or a thin-film transistor flat panel monitor. As previously described, processor 105 may utilize one or more processor cores of cores 110 to perform spreadsheet calculations and display the results to the user via display 170.

System 100 may employ a virtual memory management system comprising a virtual memory manager (VMM) 165 that is controlled by an operating system 162. VMM 165 may provide a way for system 100 to present to each process a separate virtual address space and create an illusion of a relatively large and fast memory space through the use of numerous memory devices of varying sizes and operating at different speeds. VMM 165 may use a certain amount of "physical" memory composed of relatively fast semiconductor memory, such as physical memory 160, as well as a much larger amount of "virtual" memory composed of a paging space 155 (or storage space) on a hard disk, such as available storage space on a hard drive. Physical memory 160 may comprise DRAM devices and be relatively expensive. System 100 may use virtual memory to minimize the amount of physical memory in system 100. By employing VMM 165, system 100 may use a relatively inexpensive storage device with a large capacity to expand the amount of available memory.

Physical memory 160 of system 100 may serve as a main or primary storage for instructions and data of applications being processed by processor 105 via operating system 162. VMM 165 may control the movement of information between the fixed disk, virtual memory, and DRAM, physical memory. By using a daemon 164, VMM 165 may work with operating system 162 to map pages of physical memory to corresponding virtual pages. For example, operating system 162 may comprise a multi-tasking operating system where multiple programs or applications (166 and 168) execute at the same time, each application executing within separate time slices, and with each application seeming to have an entire allocated memory space. To make room in the physical memory to execute a new program, or to allocate more memory for an already-executing program, VMM 165 or another such memory management mechanism may "swap" out an entire program (process) to disk memory or only "page" out a portion (page) of an existing process to disk.

Processor 105 may manipulate information, or data, located in memory devices located close to processor 105, such as registers of cores 110, cache 115, and physical memory 160. VMM 165 may bring in data from a disk storage device, such as a serial advanced technology attachment (SATA) hard drive 145. If no space is available at one level of the memory hierarchy where the data needs to be stored, such as in physical memory 160, some of the existing data in physical memory 160 may need to be swapped or paged out. VMM 165 and paging daemon 164 may work together to find what data should be replaced via, e.g., a least recently used (LRU) technique. For example, daemon 164 may use the LRU replacement method to determine which pages, or block(s) of data, were referenced least recently (i.e. the longest time since the last access of the data). Daemon 164 may assume the data is the least important or least likely to be immediately used, and determine that writing over or replacing the data will impact system performance less than replacing other pages or block(s) of data. Prior to replacing the content of the pages, VMM 165 may store the data from the pages to paging space 155, which may comprise different devices in different embodiments.

System 100 may have one or more serial or parallel data buses coupled to data storage devices. For example, ICH 130 may have a parallel advanced technology attachment (PATA) bus to communicate with PATA device, such as PATA hard drive 140, or a SATA bus to communicate with a SATA drive, such as SATA hard drive 145. PATA hard drive 140 and/or SATA hard drive 145 may be used to store paging information or paging data from various applications in physical memory 160, such as application 166 or application 168. In addition to use as paging devices, PATA hard drive 140 and/or SATA hard drive 145 may also store an operating system, device drivers, and application software for system 100. For example, in one embodiment SATA hard drive 145 may store a Linux® operating system. In other embodiments, PATA hard drive 140 and/or SATA hard drive 145 may contain other operating systems, such as Unix®, Macintosh® OS X, Windows®, or some other operating system.

System 100 may also be configured to operate other types of hardware devices, such as Small Computer Systems Interface (SCSI) device 150. In one or more embodiments SCSI device 150 may comprise a data storage device, such as a SCSI hard drive. In such embodiments, SCSI device 150 may provide paging space 155 for VMM 165. That is to say, SCSI device 150 may store paging data in addition to or in lieu of PATA hard drive 140 or SATA hard drive 145. For example, while executing applications 166 and 168, processor 105 may store paging data to and retrieve paging data from both PATA hard drive 140 and SCSI device 150.

System 100 may be operating at the direction of a user, executing instructions of applications 166 and 168 to perform various tasks for the user. For example, application 166 may comprise a video editing application and application 168 may comprise an Internet browser. While applications 166 and 168 execute simultaneously, applications 166 and 168 may request allocations for memory that represent a large portion of physical memory 160, reducing the free or available physical memory for system 100 below a low threshold. For instance, physical memory 160 may comprise 2 gigabytes (GB) and operating system 162, application 166, and application 168 may request allocations for 1.8 GB.

Daemon 164 may push allocated but least recently used memory for application 168 out to paging space 155 provided by SATA hard drive 145 to make more memory available for application 166. For instance, application 168 may be idle or in a background execution mode and application 166 may be demanding a considerable amount of memory and demanding significantly more processing cycles while the user is editing a large video clip.

System 100 may control the transfer of data from physical memory 160 to paging space 155 using a pair of high and low variables or thresholds. For the sake of illustration, the high and low variables may be analogous to "water marks". VMM 165 may use high and low variables to constrain the number of pages that daemon 164 has in-flight to SATA hard drive 145, or other paging space 155, at any instance in time. Using the high and low variables to constrain or "pace" the number of pages being processed at a given time may enable the applications 166 and 168 to continue to execute and yet avoid or attenuate the possibility of overloading of the disk subsystem. For example, in only a few microseconds, daemon 164 may select 200 pages to be transferred from physical memory 160 to paging space 155 of SATA hard drive 145. However, SATA hard drive 145 may only be able to handle an average of 100 transfers per second, and only be able to buffer 30 pages in buffer memory of the hard drive.

Using the high and low variables to constrain the number of transfers for a given period of time may avoid or attenuate the possibility of overloading the paging device, as the variables may limit the number of pages being identified for transference. Continuing the example above, daemon 164 may only select 30 pages instead of 200 pages and transfer those pages to the buffer of SATA hard drive 145. After starting the first batch of input/output (I/O), daemon 164 may select a next set of 30 candidate pages out of the remaining 170 pages to be sent to paging space 155. During the latency related to transferring the 30 pages to the buffer of SATA hard drive 145 and writing the data of the pages to the disk by SATA hard drive 145, applications 166 and 168 may be permitted to perform additional operations. Shortly before the data has been written to the disk, daemon 164 may start sending the second set of 30 pages.

Controlling the rate or pace at which the data or pages are sent to the paging space 155 may create a greater overlap of time between the transference of the data to the paging space 155 and the latency involved with candidate page identification. For example, if application 166 were to reference 90 pages of the remaining 170 pages, daemon 164 may remove those 90 pages from the list of pages identified or selected for transfer to paging space 155. Daemon 164 may then select another set of 90 pages using the LRU method to replace those referenced by application 166 and continue sending the modified set of 170 pages to SATA hard drive 145. Removing the referenced 90 pages from the pages identified for transfer to the paging space 155 will increase the time allotted for application 166 to access the pages, refining the selection of candidate pages to transfer to the paging space 155 and, in some situations, avoiding the immediate pull back of pages from the paging space 155 to physical memory 160. Additionally, if application 166 or 168 were to reference any of the initial 30 pages already in-flight, those pages may be returned to physical memory 160.

As illustrated above, system 100 may allow access to pages that are identified for transfer to paging space 155, but which are not actually selected and in the process of being transferred. For example, the initial 30 pages may be in the process of being transferred, so system 100 may block access to those pages such as by setting access bits in a table stored in physical memory 160. Instead of blocking access to the remaining 170 candidate pages to prevent the 170 candidate pages from being modified during the I/O operation, system 100 may permit or enable access to those 170 pages and monitor such accesses until daemon 164 selects another set of pages to be placed in-flight. Because the pre-selected pages are not immediately subject to I/O, system 100 may delay the blocking of those pages until the I/O low-water mark variable is reached. Delaying the transfer of the pre-selected pages may permit VMM 165 to further refine the candidate list by observing or monitoring reference attempts to candidate pages during the delay period. Additionally, because the pages are pre-selected, system 100 may gain additional statistical insight into the access patterns of the applications which may help increase election efficiency.

In various embodiments, ICH 130 may allow system 100 to store and retrieve data from a universal serial bus (USB) device 180 via a Peripheral Component Interconnect (PCI) controller 175. System 100 may store and retrieve data from USB device 180 as part of running an application. Alternatively, in at least one alternative embodiment, system 100 may store and retrieve paging data to USB device 180. For example, VMM 165 may send and receive paging data for application 168 to USB device 180, which may comprise a flash memory storage device. In other words, alternative embodiments may employ USB device 180 to store paging data in addition to, or as a substitute for ATA or SCSI storage devices 140, 145, and 150. An example application for such an arrangement may be an embedded system subject to a harsh environment, such as computing device in an automobile or a military aircraft subject to extreme vibrating conditions.

System 100 may also store and retrieve data, which may include paging data, via PCI controller 175 and communication device 185. For example, communication device 185 may comprise a network card. Processor 105 may send and receive paging data, to another computer system or a network storage device connected to system 100 via a local area network (LAN) and/or the Internet. System 100 may also couple with other types of hardware not depicted in FIG. 1, such as a sound card, a scanner, a printer, and other types of hardware devices. System 100 may interact with these types of devices in various alternative embodiments and use one or more of the devices to store and/or retrieve paging data. For example, system 100 may couple with a scanner that generates a relatively large amount of data in a relatively short amount of time, such as when the scanner scans a high resolution color image. In such an alternative embodiment, application 166 may comprise a scanning application and system 100 may store the data of the scan to a paging device, such as SATA HD 145.

In other embodiments, the other types of hardware may comprise devices such as compact disc (CD) drives, and digital versatile disc (DVD) drives. For example, ICH 130 may couple with a CD read only memory (CD ROM) drive via a parallel ATA bus. In further embodiments, ICH 130 may couple with a compact disc recordable (CD-R) drive, a CD rewritable (CD-RW) drive, a DVD drive, a tape drive, or other storage device. Such devices may work in conjunction with an application in physical memory 160 and may cause system 100 to transfer data from the devices to paging space 155 provided by VMM 165.

The embodiment of system 100 shown in FIG. 1 illustrates how processor 105 may operate in a relatively complex system 100 having the aforementioned components. Alternative embodiments may contain many more elements, peripheral devices, and memory devices, or far fewer elements. For example, system 100 may comprise a portable computing device wherein processor 105 couples directly to a local display device, physical memory 160, and a page memory storage device, such as a SCSI hard drive (150) or a nonvolatile memory 120 which may comprise an embedded flash memory module. Such a system may exclude some system components such as ICH 130, MCH 110, and SATA hard drive 145.

Figure 2:
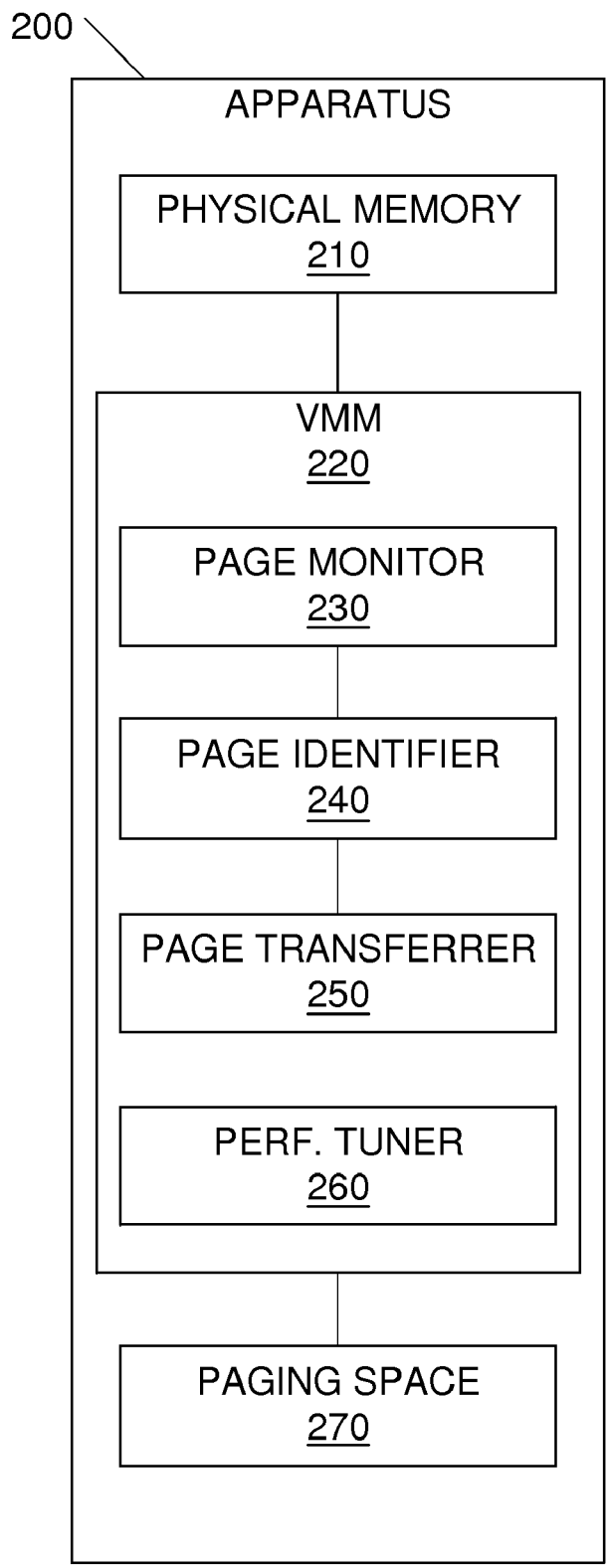
FIG. 2 depicts an embodiment of an apparatus having numerous VMM modules that may manage pages being sent to a paging space.

FIG. 2 illustrates an embodiment of an apparatus 200 that may manage pages or blocks of data being sent to a paging space, such as pages of physical memory 160 that may be sent to a paging space provided by SATA hard drive 145, PATA hard drive 140, SCSI device 150, and/or USB device 180 of FIG. 1. More specifically, apparatus 200 comprises physical memory 210, a paging space 270, and a virtual memory manager (VMM) 220 having a page monitor 230, a page identifier 240, a page transferrer 250, and a performance tuner 260. In some embodiments, apparatus 200 may comprise a computing device such as a desktop computer, a laptop, or server. In other embodiments, apparatus 200 may comprise a smaller computing device such as a portable music player, a personal digital assistant (PDA), a palmtop or handheld computer, or a multimedia device such as a digital camera or a video recorder. In even further embodiments, apparatus 200 may comprise a circuit board or even an application-specific integrated circuit (ASIC) in a computing device.

Physical memory 210 may vary in size and technology from embodiment to embodiment. For example, in one embodiment physical memory 210 may comprise 4 GB of DRAM. In another embodiment, physical memory 210 may comprise 512 MB of static RAM. VMM 220 may comprise software, firmware, hardware, a state machine, and/or other logic to implement management of data of a memory device for apparatus 200. In numerous embodiments, VMM 220 may comprise a software routine or collection of software routines running within an operating system to transfer data between physical memory and virtual memory. For example, VMM 220 may comprise a set of software routines of operating system 162, transferring pages or blocks of data of physical memory 160 to and from a paging space provided by a SCSI hard drive (SCSI device 150). In an alternative embodiment, VMM 220 may comprise a portion of program code for operating a portable computing device, such as cellular telephone. VMM 220 may reside within firmware and may transfer data between a physical memory device, such as a DRAM chip, and a virtual memory device, such as an embedded or a removable flash memory drive. For example, the portable computing device may have a removable flash card that provides a paging space for the portable computing device, such that VMM 220 may transfer data between physical memory and the removable flash card. As one skilled in the art will recognize, physical memory 210, VMM 220, and the device providing paging space 270 may vary greatly from embodiment to embodiment.

Depending on the embodiment, VMM 220 may comprise page identifier 240 and page transferrer 250. As apparatus 200 operates, data may accumulate in physical memory 210, such that physical memory 210 becomes full or near full. For example, physical memory 210 may be 4 GB and storing 3.6 GB of data. To make more room in physical memory 210, such as by moving a portion of rarely accessed data to paging space 270, page identifier 240 may identify pages to be sent to paging space 270. For example, page identifier 240 may comprise a software daemon that identifies 300 pages of data, wherein each page may be 4 kilobytes (KB) of data, which have not been referenced or accessed in a relatively long time.

After identifying the 300 pages, page identifier 240 may select a set or portion of pages to start sending to paging space 270. For example, page identifier 240 may select 50 of the 300 pages, whereupon page transferrer 250 may start sending the 50 pages to paging space 270. Upon selecting the first set of pages, page identifier 240 may pre-select another set of pages to transfer upon completing the transmission of the first set. For example page identifier 240 may pre-select a second set of 40 pages from the remaining 250 for transmission to paging space 270 after page transferrer 250 transfers the first set of 50 pages.

Transferring the first set of 50 pages from physical memory 210 to paging space 270 will take a finite amount of time. There will be a period of delay between the time that the first 50 pages are identified and the time that the last page of the 50 pages has been transferred to paging space 270. In other words, there will be a delay period before page transferrer 250 starts transferring the set of pages after the first 50 pages. During the delay period, apparatus 200 may reference one or more of the pages identified as candidates for transference to paging space 270 still awaiting transference. For example, apparatus 200 may access or update data in 20 pages of the remaining 250 pages, such as 10 pages in the second set of 40 pages and 10 different pages in the other remaining 210 pages (250−40=210). Upon transferring the first set of 50 pages, page identifier 240 may recognize or determine that 10 pages of the second set of 40 pages have been accessed. For example, page identifier 240 may detect the accessed 10 pages by setting a bit in a table used to track accessed pages. Accordingly, page identifier 240 may use the table of accessed pages to exclude those accessed 10 pages and enable page transferrer 250 to transfer the other 30 unaccessed pages of the second set. In other words, page identifier 240 may prevent page transferrer 250 from transferring pages of memory that were previously identified as candidates for transferring to paging space 270, but which were subsequently accessed or updated.

While page transferrer 250 sends the unaccessed 30 pages of the second set to paging space 270, page identifier 240 may pre-select another set of unaccessed pages to be transferred upon the completion of sending the unaccessed 30 pages of the second set. For example page identifier 240 may pre-select a third set of 60 pages from the remaining 200 pages to be sent to paging space 270 after the unaccessed 30 pages have been transferred. The cycle of identifying sets of candidate pages, transferring pages to the paging space, determining which candidate pages waiting to be transferred have been unaccessed, and sending the unaccessed candidate pages of subsequent sets to paging space 270 may continue until enough memory of physical memory 210 has been freed for use by apparatus 200.

In the description of the embodiment above, page identifier 240 determined which pages of the second and subsequent sets were accessed or referenced in identifying which pages to transfer to paging space 270. In alternative embodiments, a different element may make the determinations of which pages were accessed. For example, as depicted in FIG. 2 an embodiment of apparatus 200 may comprise a page monitor 230 that monitors accesses to candidate pages which await transfer. In other words, page monitor 230 may comprise an optional module for one or more alternative embodiments, separate from page identifier 240, which determines whether any pages of the second and subsequent sets are referenced or accessed. Page monitor 230 may track such accesses to those candidate pages via a table or list, or even a status bit for each memory address. Consequently, monitoring page accesses may allow page identifier 240 to continually or periodically update the list of remaining candidate pages. For example, page identifier 240 may modify the second set by adding candidate pages to make up for the pages that page monitor 230 determined were referenced, such as by adding 10 more unreferenced candidate pages to the 30 unreferenced pages to bring the total pages of the second set back up to 40 pages.

Additionally, page identifier 240 may identify other candidate pages, previously unidentified as candidates for transfer, to accomplish the original goal of transferring 300 pages to paging space 270. Continuing with our previous example, page identifier 240 may identify an additional 20 pages to replace the 20 candidate pages which were referenced during the transfer of the first 50 pages.

Depending on the embodiment, apparatus 200 may also include a performance tuner 260 to alter the sizes of subsequent sets to be transferred to paging space 270. To accomplish tuning, performance tuner 260 may keep count or track the fraction of pages that are referenced during the delay periods. Periodically, performance tuner 260 may dynamically scale the size of the pre-selection sets corresponding to the fraction of pages which are referenced. For example, if an average of 40% of the candidate pages in the subsequent sets is referenced during the delay period, performance tuner 260 may decrease the size of the sets that page identifier 240 selects from 50 pages to 20 pages. Conversely, if an average of 2% of the candidate pages is referenced during the delay period, performance tuner 260 may increase the size of the sets for page identifier 240 from 50 pages to 75 pages.

Figure 3:
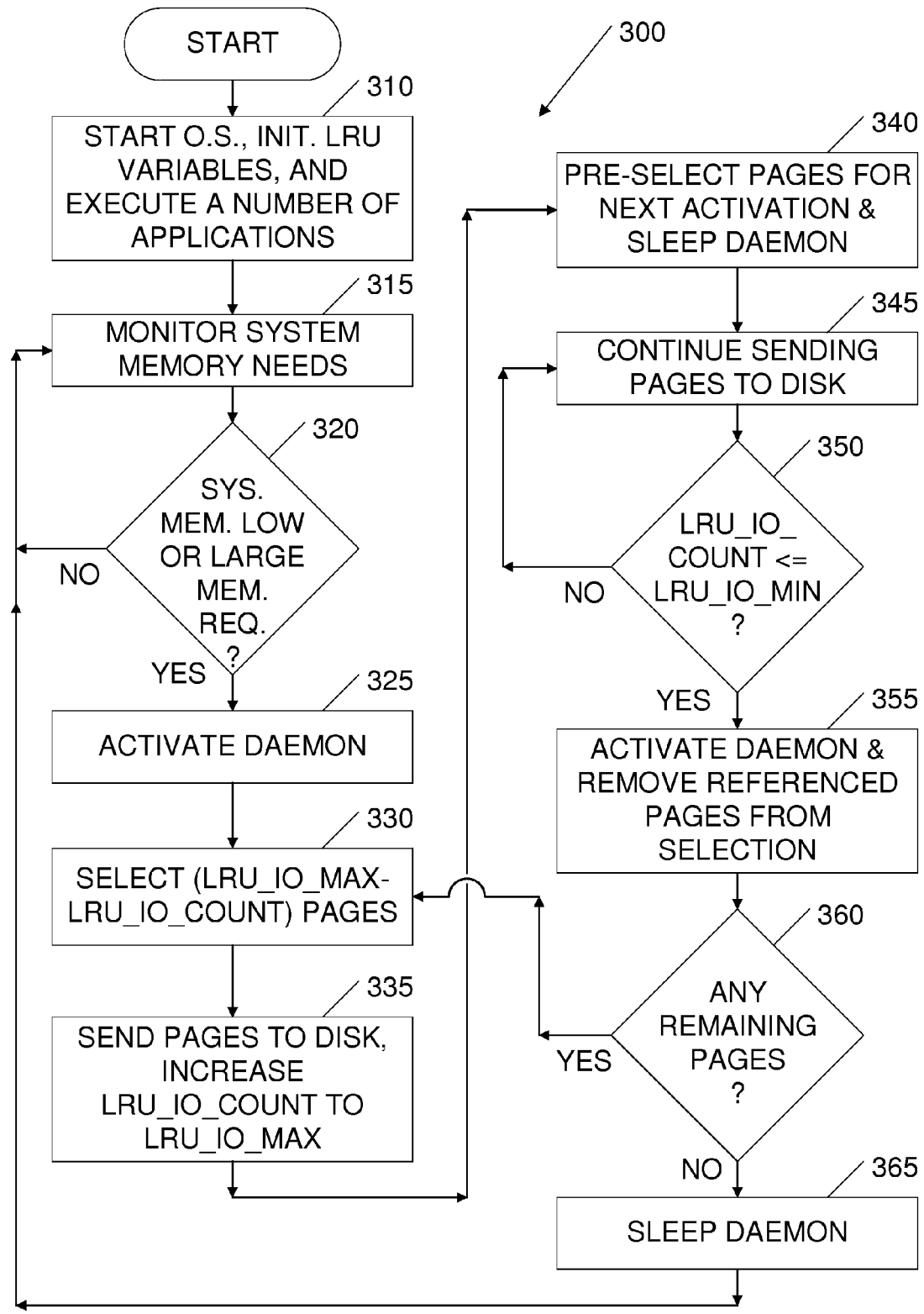
FIG. 3 illustrates a flow chart of a process for selecting pages to be sent to a disk and controlling the transfer of the pages to the disk.

To see how a VMM of system 100 in FIG. 1 or apparatus 200 in FIG. 2 may control the transfer of data sent to a paging space, we turn now to FIG. 3. FIG. 3 illustrates a flowchart 300 of a process for selecting pages to be sent to a disk, or paging space, and controlling the transfer of the pages to the paging space. For example, one or more embodiments may be implemented as a software routine for a computing device, portions of which may comprise a software module of a virtual memory manager in an IBM z/OS (operating system) of a server. As one skilled in the art will recognize, the process may be implemented differently in other embodiments.

The process may first involve starting the operating system, initializing LRU routine variables, and executing a number of applications (element 310). For example, a systems administrator may boot up a server, whereupon the server loads a z/OS operating system, a web server application, an e-mail simple mail transfer protocol (SMTP) application, and a post office protocol (POP) e-mail application. The process may initialize at least three variables: LRU_IO_MAX, LRU_IO_MIN, and LRU_IO_COUNT. The LRU_IO_MAX variable may provide a maximum number of pages to be transferred, while the LRU_IO_MIN variable may provide a minimum number of pages to be transferred. The LRU_IO_COUNT variable may represent the number of pages in-flight, such as pages that have the read/write access associated with the pages blocked, where the pages are in a queue and in the process of being sent to the disk/paging space. For example, the process may initially set LRU_IO_MAX to 100, LRU_IO_MIN to 40, and initialize LRU_IO_COUNT to 0.

According to one or more software routines, a VMM or other mechanism of the operating system may monitor the system memory needs (element 315). For example, the VMM may prepare and track the amount of physical memory that applications consume while they are running. As the applications continue to run, the process may involve detecting when one or more of the applications request or attempt to access more memory than that amount of physical memory which remains available, or sense when the amount of free physical memory drops below a low threshold (element 320). For example, the SMTP application may request an additional 1 MB of memory while transferring a large e-mail attachment and cause the system free memory to drop below a minimum free memory threshold.

Upon detection of the large memory request or low system memory condition, the process may involve activating an LRU daemon (element 325) that selects a first set of pages. For example, the VMM may determine that 255 pages need to be removed from physical memory and transferred to the paging space. Using an LRU method, the VMM may identify 255 pages in memory that have been used least recently. Of the identified 255 pages, the daemon may select a first subset of 100 pages (element 330). In other words, the daemon may select LRU_IO_MAX-LRU_IO_COUNT pages, which may initially be equivalent to 100-0=100, and prepare to transfer the 100 pages to the paging space.

As part of the preparation of the pages for transference to the paging space, the VMM may block access to a portion or all of the first subset of 100 pages to prevent the blocked pages from being modified during their transfer to the paging space. For example, the VMM may block access to 60 pages of the first set of 100 (LRU_IO_MAX-LRU_IO_MIN=100-40=60) by setting an access bit in a table used to identify which pages may be accessed and which pages may not be accessed.

The VMM may immediately start asynchronously sending the first subset of 60 pages to the paging space and increasing the LRU_IO_COUNT to LRU_IO_MAX (element 335). For the transfer, the daemon may increase the LRU_IO_COUNT to the number of pages selected. Continuing with our example, the daemon may change the LRU_IO_COUNT from 0 to 100. Upon initiating the transfer of the first subset, the LRU daemon may also pre-select additional pages for the next activation of the LRU daemon and then the LRU daemon may go to sleep (element 340).

Upon pre-selecting the additional pages, the VMM may enter the sleep state. Entering the sleep state may be considered the beginning of the delay period. During the delay period, the VMM may continue sending pages of the current subset (first 60 pages of the initial 100 pages) to the disk/paging space (element 345). As individual pages are sent to the paging space the VMM may decrement the LRU_IO_COUNT for each page transferred.

Once the VMM has transferred a portion of the pages of the current subset to the paging space the VMM may activate the daemon to transfer additional pages to the paging space (elements 350 and 355). For example, the VMM may transfer 60 pages to the paging space, and decrease the LRU_IO_COUNT from 100 to 40. Upon the transference of the 60 pages, LRU_IO_COUNT will have a value of 40 and equal LRU_IO_MIN, which will have the initial value of 40 (element 350).

Upon activating the daemon, the VMM may determine which remaining pages of the identified 255 candidate pages were referenced during the delay period so that those pages may be removed from the list of pages to be transferred to disk (element 355). In other words, during the delay period an application or other program of the system or apparatus employing the process of FIG. 3 may access one or more of the remaining 195 candidate pages (255-60=195) that did not have their accesses blocked. The VMM may note which candidate pages are referenced during the delay. Then the VMM may remove any referenced pages from the identified or selected list of candidate pages (element 355).

Because the pre-selected pages are not immediately subject to being transferred to the paging space, the VMM may delay the blocking access to the pre-selected pages until the input-output (I/O) "low-water mark" is reached. Doing so may permit the VMM to further refine the candidate list by observing reference attempts to candidate pages during the delay period. Because the pages are pre-selected, the VMM may gain additional statistical insight into the access patterns of the applications which may permit later page selection to be improved.

Returning back to our discussion of FIG. 3, once the daemon is awakened to do more work the daemon may immediately process the pre-selection list, sending those pages which have not been touched in the delay period to disk. If there are any remaining candidate pages to be sent to the disk (element 360), a system or apparatus may select additional candidate pages to bring LRU_IO_COUNT back up to the maximum again (element 330). For example, the daemon may select a second subset of LRU_IO_MAX-LRU_IO_COUNT pages, which may be equivalent to 100-40=60. The VMM may prepare to transfer the selected pages to the paging space by blocking access to the second subset of 60 pages. An apparatus for system employing the process of FIG. 3 may repeat the process (elements 330, 335, 340, 345, 350, and 355) until there are no more remaining pages to be sent to the disk (element 360). When there are no more remaining pages, daemon may go back to sleep (element 365) and allow the VMM to continue monitoring the memory usage of the system or apparatus (element 315).

The VMM may also track the fraction of pages that are referenced during the delay period. Based on the references, the VMM or some other mechanism of the system/apparatus may dynamically scale the pre-selection size to adapt to number of references. For example, the daemon may frequently select a set of pages equal to (LRU_IO_MAX-LRU_IO_MIN). If the fraction of pages accessed (and thus not sent to disk) is p, the VMM may alternately have the daemon pre-select (LRU_IO_MAX-LRU_IO_MIN)*(1-p) pages instead. Having the daemon pre-select an alternate number of pages based on the accesses, the VMM may reduce the number of pages that need to be checked for prior access when the daemon wakes to select additional candidate pages for subsequent subsets.

Figure 4:
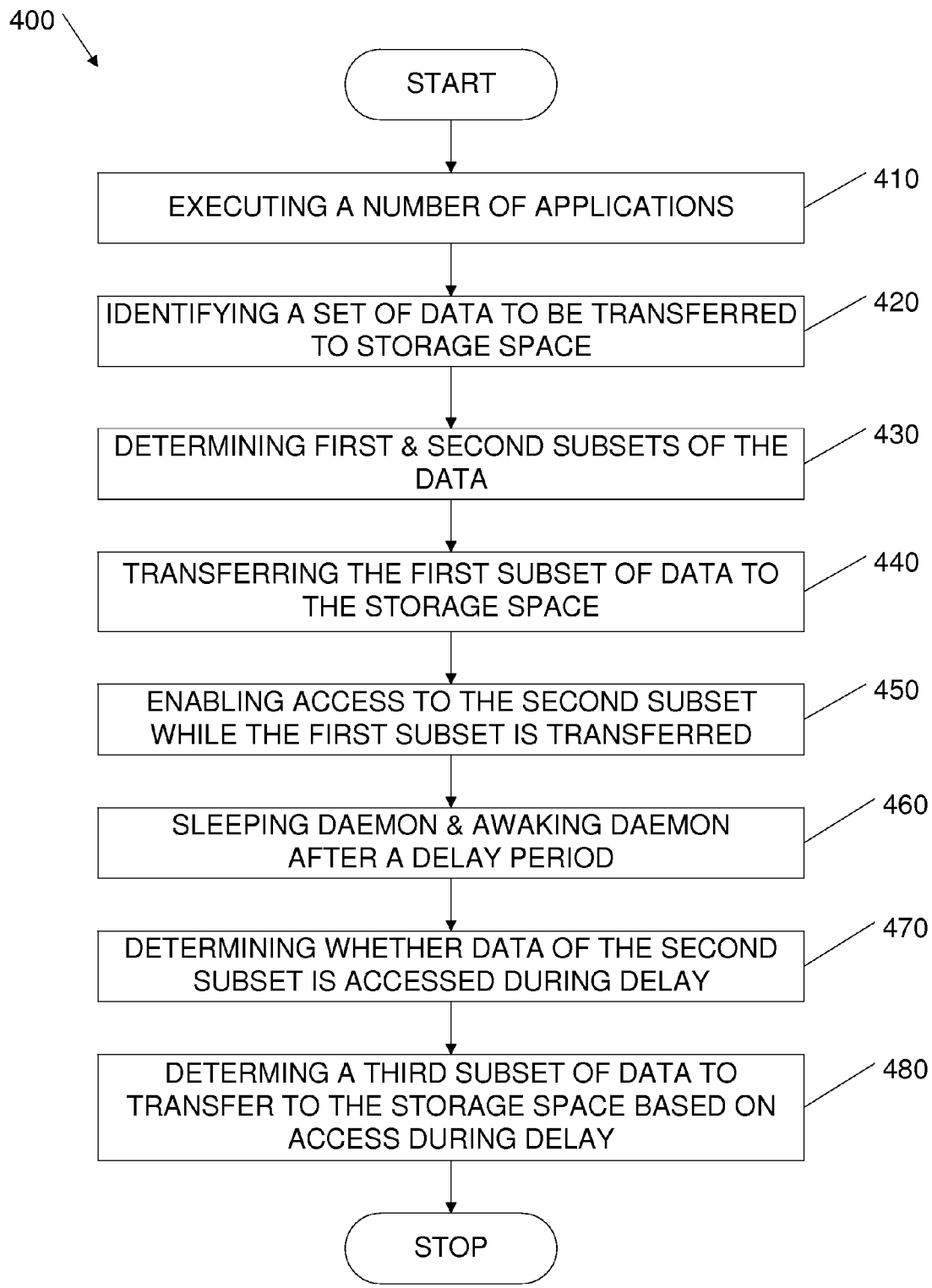
FIG. 4 illustrates a flow chart of an embodiment of a method for selecting and transferring data to a storage space of virtual memory.

FIG. 4 illustrates a flowchart 400 of an embodiment for selecting and transferring data to a storage space of virtual memory. Flowchart 400 begins with executing a number of applications (element 410). For example, a user of a laptop computer may have a spreadsheet application, a computer aided design application, and a word processing program executing concurrently via an IBM AIX® operating system. The memory requirements of these applications may require the use of virtual memory. A flash memory hard drive may supplement the physical memory and provide the virtual memory.

Flowchart 400 continues by identifying a set of data to be transferred to storage space (element 420). Continuing with our previous example, the spreadsheet application may need to use an additional 360 megabytes (MB) of memory to perform some type of operation such as pasting a large amount of data into a worksheet. To accomplish the operation, a memory management mechanism of the operating system may transfer 300 MB from physical memory of the laptop to virtual memory storage space provided by the hard drive or other data storage medium of the laptop. The memory management mechanism may comprise a daemon that uses a method, such as a least recently used routine, to identify 300 MB of candidate data to be transferred to the hard drive.

After identifying the 300 MB of candidate data, an embodiment may determine first and second subsets of the data (element 430). For example, the embodiment may select 50 MB out of the 300 MB, leaving 250 MB. The embodiment may start transferring the first subset of data to the storage space (element 440). While transferring the first subset of 50 MB, the embodiment may enable access to the second subset of the remaining 250 MB (element 450). For example, the embodiment may control access to candidate data by using status bits in an access table. A bit in one state may permit access to data of an address, a page, or other group of data. Applications of the embodiment may continue to read from and/or write to the physical memory containing data when the bit is in the "access" state. If the bit is in a second state, the embodiment may block access to the data referenced by the bit. An embodiment may need to set the bit to the "block" state before transferring the referenced data to the storage space.

Because the task of writing the first subset of 50 MB of data to the storage space is likely to last for millions or hundreds of millions of clock cycles and more, there will be a delay period between the time the transfer of data begins and when the transfer of data ends. For example, many processors may operate at speeds measured in gigahertz, while I/O transactions may be measured in operations or transactions-per-second. In other words, the number of clock cycles that elapse before the transfer of data ends is likely to be relatively large and vary in number based on a variety of factors.

At the beginning of a delay period, an embodiment may place the daemon in a sleep state until after the transfer is complete or is nearly complete (element 460). Once awakened, the daemon may determine whether data of the second subset of 250 MB was accessed during the delay (element 470). For example, during the delay an application may have updated 10 MB of the remaining 250 MB of candidate data.

As illustrated by flowchart 400, the daemon may select a third subset of data to be transferred to the storage space (element 480) if the daemon determines that no data was accessed during the delay. For example, the daemon may select another subset of 50 MB of data out of the remaining 250 MB of candidate data. If the daemon determines that some data was accessed during the delay, the daemon may eliminate the accessed data from the candidate data before selecting the third subset (element 480). For example, if the daemon determines that the application updated the 10 MB during the delay, the daemon may identify an additional 10 MB of candidate data to bring the remaining total of candidate data up to 250 MB and select 50 MB of the updated candidate data for transference to the storage space. The embodiment may then start transferring the next set of 50 MB of data to the storage space, while enabling access to the remaining 200 MB. During the transfer, an embodiment may again place the daemon in a sleep state until after the transfer is nearly complete and awaken the daemon to determine whether data of the remaining 200 MB was accessed during the delay. Based on the access during the delay, the daemon may select additional candidate data to replace the amount of data accessed, select a subsequent subset of data, and start transferring the subsequent subset to the storage space.

Flowchart 400 of FIG. 4 illustrates a cycle that may be repeated numerous times in an embodiment. The cycle of determining a subset of candidate data, enabling access to the subset of candidate data while transferring the subset to the storage space, enabling access to the remaining candidate data during the delay period associated with the transfer, and selecting additional subsets of unaccessed data for transfer to the storage space may continue until all of the identified candidate pages are transferred to the storage space. Additionally, the cycle may be repeated when subsequent sets of data need to be transferred to storage space, such as by new requests for memory from various applications executing on the system.

Another embodiment is implemented as a program product for implementing systems and methods described with reference to FIGS. 1-4. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of description and illustration, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

Those skilled in the art, having the benefit of the present disclosure, will appreciate that the disclosure contemplates controlling the transfer of data for virtual memory management of a computing device. Those skilled in the art will also understand and appreciate that the form of the embodiments shown and described in the detailed description and the drawings are to be taken merely as examples. The following claims are to be interpreted broadly to embrace all variations of the example embodiments disclosed.

Although the present disclosure and some of the advantages of the disclosure have been described in detail for some embodiments, one should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, in a data processing system, for paging out data from a memory of the data processing system to a storage device of the data processing system, comprising:
identifying a set of data to transfer to a storage space of a virtual memory management system as part of the paging out operation;
transferring at least a portion of a first subset of the set to the storage space; and
selecting a second subset of the set to transfer to the storage space, wherein data of the second subset is accessible by one or more applications running on the data processing system while the second subset is part of the set of data to transfer and during the time required to complete the transference of the at least a portion of the first subset of the set to the storage space.

2. The method of claim 1, further comprising identifying further data to be added to the set.

3. The method of claim 1, further comprising placing a daemon of the virtual memory system into a sleep state during the transference of the at least a portion of the first subset.

4. The method of claim 1, further comprising transferring a third subset of data of the set to the storage space, wherein the third subset comprises data unaccessed for the time of transference of the first and second subsets.

5. The method of claim 1, further comprising setting a bit of a table to block access to data of the first subset.

6. A method, comprising:
identifying a set of data to transfer to a storage space of a virtual memory management system;
transferring at least a portion of a first subset of the set to the storage space;
selecting a second subset of the set to transfer to the storage space, wherein data of the second subset is accessible for the time of transference of the at least a portion;
transferring a third subset of data of the set to the storage space, wherein the third subset comprises data unaccessed for the time of transference of the first and second subsets; and
altering a size of the third subset based on accesses of the second subset during the time of transference of the first subset.

7. An apparatus, comprising:
a page identifier to identify a set of pages of a memory to transfer to a paging space of a virtual memory management system as part of a paging out operation for paging out data from the memory to a storage device; and
a page transferrer to transfer pages of a first subset of the set to the paging space, wherein pages of a second subset of the set are accessible by one or more applications running on the apparatus while the second subset is part of the set of pages to transfer and during the transference of at least a portion of the first subset.

8. The apparatus of claim 7, further comprising a page monitor to determine which pages of the set are accessed before being blocked for transfer to the paging space.

9. The apparatus of claim 7, further comprising a processor, a display, a keyboard, and a network communications device, wherein the paging space comprises at least one of a hard disk and a flash memory device.

10. The apparatus of claim 7, wherein the page identifier is arranged to select unaccessed pages for the second subset, wherein the selection of unaccessed pages comprises identifying at least one accessed page of the set.

11. The apparatus of claim 7, wherein the page identifier is arranged to identify additional pages to transfer to the paging space based on access to pages of the set.

12. An apparatus, comprising:
a page identifier to identify a set of pages to transfer to a paging space of a virtual memory management system;
a page transferrer to transfer pages of a first subset of the set to the paging space, wherein pages of a second subset of the set are accessible during the transference of at least a portion of the first subset;
a page monitor to determine which pages of the set are accessed before being blocked for transfer to the paging space; and
a performance tuner to alter a size of a subset to be transferred to the paging space based on accesses of identified pages.

13. An apparatus, comprising:
a page identifier to identify a set of pages to transfer to a paging space of a virtual memory management system; and
a page transferrer to transfer pages of a first subset of the set to the paging space, wherein pages of a second subset of the set are accessible during the transference of at least a portion of the first subset, wherein the page identifier identifies the pages to be sent based upon at least three variables, wherein further the first variable provides a maximum number of pages to be transferred, the second variable provides a minimum number of pages to be transferred, and the third variable is related to a number of pages to be transferred during a delay.

14. A computer program product comprising:
a computer readable storage medium including instructions that, when executed by a processor:
identify a set of data to be transferred to a storage space of virtual memory as part of a paging out operation for paging out data from a memory of a data processing system to a storage device of the data processing system;
transfer a first subset of the set, wherein access to the first subset is blocked for the transference; and
identify a second subset of the set, wherein the identification of the second subset comprises removing data of the set accessed prior to completion of the transference of the first subset, wherein data of the second subset is accessible by one or more applications running on the data processing system while the second subset is part of the set of data to be transferred and during the time required to complete the transference of the first subset to the storage space.

15. The computer program product of claim 14, further comprising instructions that, when executed by the processor, set bits of a table to enable and block access to data of the set.

16. The computer program product of claim 14, further comprising instructions that, when executed by the processor, determine which data of the set is accessed subsequent to the identification of the set.

17. The computer program product of claim 14, further comprising instructions that, when executed by the processor, identify more data to transfer to the storage space based upon the removed data.

18. The computer program product of claim 14, further comprising instructions that, when executed by the processor, wake a daemon for the identification of the second subset.

19. A computer program product comprising:
a computer readable storage medium including instructions that, when executed by a processor;

identify a set of data to be transferred to a storage space of virtual memory;

transfer a first subset of the set, wherein access to the first subset is blocked for the transference;

identify a second subset of the set, wherein the identification of the second subset comprises removing data of the set accessed prior to completion of the transference of the first subset;

determine which data of the set is accessed subsequent to the identification of the set; and dynamically scale an amount of data selected for transference to the paging space based on a fraction of data of the set that is referenced by one or more applications executing on a data processing system comprising the processor.

* * * * *